(12) United States Patent
Nitta et al.

(10) Patent No.: US 11,573,404 B2
(45) Date of Patent: Feb. 7, 2023

(54) CAMERA OPTICAL LENS

(71) Applicant: AAC Optics Solutions Pte. Ltd., Singapore (SG)

(72) Inventors: Koji Nitta, Osaka (JP); Lei Zhang, Shenzhen (CN); Yuanshan Cui, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 329 days.

(21) Appl. No.: 16/908,738

(22) Filed: Jun. 23, 2020

(65) Prior Publication Data

US 2021/0373289 A1 Dec. 2, 2021

(30) Foreign Application Priority Data

May 27, 2020 (CN) .......................... 202010459559.6

(51) Int. Cl.
*G02B 9/62* (2006.01)
*G02B 13/00* (2006.01)
*G02B 1/04* (2006.01)

(52) U.S. Cl.
CPC ......... *G02B 13/0045* (2013.01); *G02B 1/041* (2013.01); *G02B 9/62* (2013.01)

(58) Field of Classification Search
CPC ...... G02B 13/0045; G02B 1/041; G02B 9/62; G02B 13/18; G02B 15/1461; G02B 27/0012; G02B 13/06; G02B 13/00
See application file for complete search history.

(56) References Cited

U.S. PATENT DOCUMENTS

| | | | |
|---|---|---|---|
| 2014/0111872 A1* | 4/2014 | Tang | G02B 13/22 359/713 |
| 2017/0010444 A1* | 1/2017 | Teraoka | G02B 9/62 |
| 2017/0017064 A1* | 1/2017 | Jo | G02B 13/0045 |
| 2017/0248770 A1* | 8/2017 | Chen | G02B 9/62 |
| 2019/0235209 A1* | 8/2019 | Lee | G02B 13/02 |
| 2019/0250378 A1* | 8/2019 | Son | G02B 9/62 |

OTHER PUBLICATIONS

Examiner provided machine translation of Lin, CN 107861218 (Year: 2018).*

* cited by examiner

*Primary Examiner* — Balram T Parbadia
(74) *Attorney, Agent, or Firm* — W&G Law Group (57) ABSTRACT

The present disclosure relates to the field of optical lenses and provides a camera optical lens sequentially including, from an object side to an image side, first to sixth lenses. The camera optical lens satisfies following conditions: $3.00 \leq (d1+d2)/d3 \leq 4.00$; $1.50 \leq (d9+d10)/d11 \leq 3.00$; and $-5.00 \leq R9/R11 \leq -4.60$, where d1, d3, d9 and d11 denotes on-axis thicknesses of the first, second, fifth and sixth lenses, respectively; d2 denotes an on-axis distance from an image side surface of the first lens to an object side surface of the second lens; d10 denotes an on-axis distance from an image side surface of the fifth lens to an object side surface of the sixth lens; and R9 and R11 denote curvature radiuses of object side surfaces of the fifth and sixth lenses, respectively. The camera optical lens according to the present disclosure can achieve high optical performance while satisfying design requirements for ultra-thin, wide-angle lenses having large apertures.

18 Claims, 9 Drawing Sheets

CAMERA OPTICAL LENS

TECHNICAL FIELD

The present disclosure relates to the field of optical lens, and more particularly, to a camera optical lens suitable for handheld terminal devices, such as smart phones or digital cameras, and camera devices, such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is becoming increasingly higher, a five-piece or six-piece lens structure gradually emerges in lens designs. Although the common six-piece lens has good optical performance, its refractive power, lens spacing and lens shape settings still have some irrationality, such that the lens structure cannot achieve high optical performance while satisfying design requirements for ultra-thin, wide-angle lenses having large apertures.

SUMMARY

In view of the problems, the present disclosure aims to provide a camera optical lens, which can achieve high optical performance while satisfying design requirements for ultra-thin, wide-angle lenses having large apertures.

In an embodiment, the present disclosure provides a camera optical lens. The camera optical lens sequentially includes, from an object side to an image side: a first lens having a positive refractive power; a second lens having a negative refractive power; a third lens; a fourth lens; a fifth lens having a positive refractive power; and a sixth lens having a negative refractive power. The camera optical lens satisfies following conditions: $3.00 \leq (d1+d2)/d3 \leq 4.00$; $1.50 \leq (d9+d10)/d11 \leq 3.00$; and $-5.00 \leq R9/R11 \leq -4.60$, where d1 denotes an on-axis thickness of the first lens; d2 denotes an on-axis distance from an image side surface of the first lens to an object side surface of the second lens; d3 denotes an on-axis thickness of the second lens; d9 denotes an on-axis thickness of the fifth lens; d10 denotes an on-axis distance from an image side surface of the fifth lens to an object side surface of the sixth lens; d11 denotes an on-axis thickness of the sixth lens; R9 denotes a curvature radius of an object side surface of the fifth lens; and R11 denotes a curvature radius of the object side surface of the sixth lens.

The present disclosure has advantageous effects in that the camera optical lens according to the present disclosure has excellent optical characteristics and is ultra-thin, wide-angle and has a large aperture, making it especially suitable for high-pixel camera optical lens assembly of mobile phones and WEB camera optical lenses formed by camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
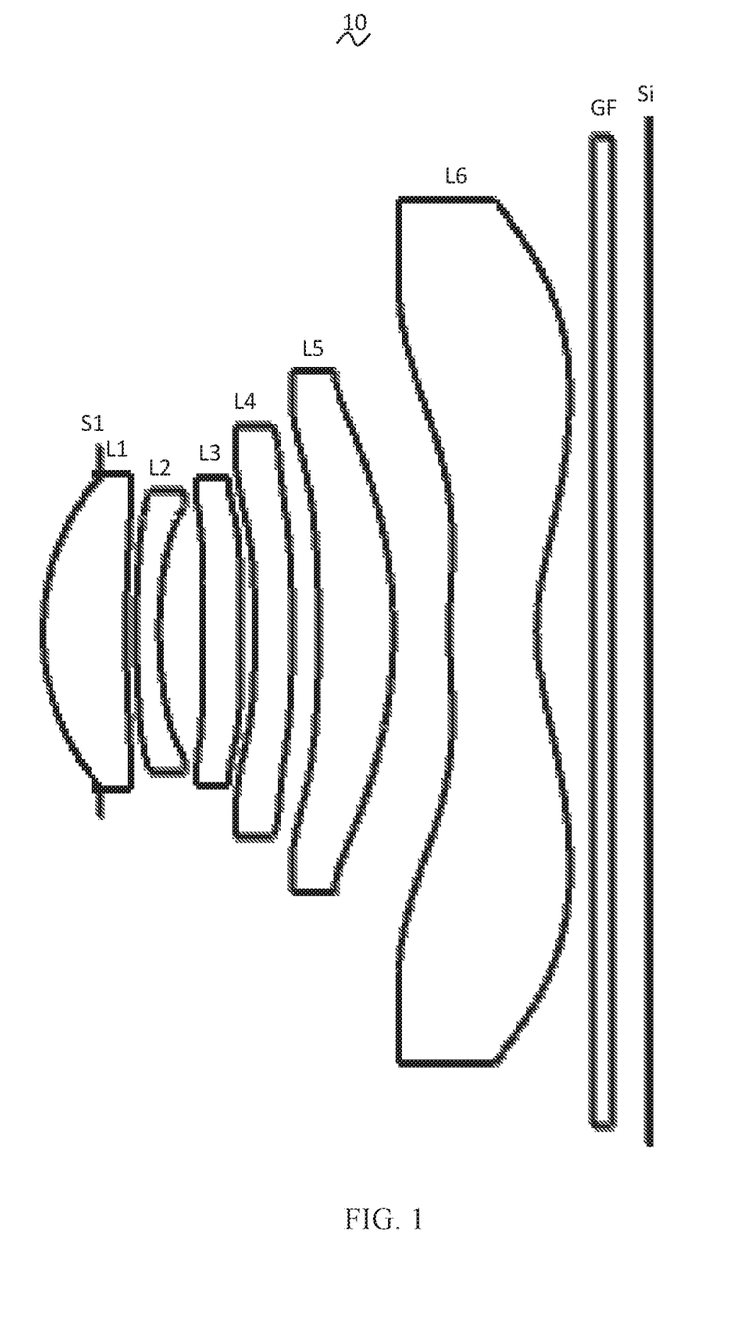
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 6 lenses. Specifically, the camera optical lens 10 sequentially includes, from an object side to an image side, an aperture S1, a first lens L1, a second lens L2, a third lens L3, a fourth lens L4, a fifth lens L5, and a sixth lens L6. An optical element such as a glass filter (GF) can be arranged between the sixth lens L6 and an image plane Si.

The first lens L1 has a positive refractive power, the second lens L2 has a negative refractive power, the third lens L3 has a negative refractive power, the fourth lens L4 has a positive refractive power, the fifth lens L5 has a positive refractive power, and the sixth lens L6 has a negative refractive power.

The first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material.

An on-axis thickness of the first lens L1 is defined as d1, an on-axis distance from an image side surface of the first lens L1 to an object side surface of the second lens L2 is defined as d2, and an on-axis thickness of the second lens L2 is defined as d3. The camera optical lens 10 should satisfy a condition of $3.00 \leq (d1+d2)/d3 \leq 4.00$, which can reduce the vulnerability of the camera optical lens 10 to an eccentricity of the second lens L2.

An on-axis thickness of the fifth lens L5 is defined as d9, an on-axis distance from an image side surface of the fifth lens L5 to an object side surface of the sixth lens L6 is defined as d10, and an on-axis thickness of the sixth lens L6 is defined as d11. The camera optical lens 10 should satisfy a condition of $1.50 \leq (d9+d10)/d11 \leq 3.00$, which can reduce the vulnerability of the camera optical lens 10 to an eccentricity of the sixth lens L6.

A curvature radius of an object side surface of the fifth lens L5 is defined as R9, and a curvature radius of the object side surface of the sixth lens L6 is defined as R11. The camera optical lens 10 should satisfy a condition of $-5.00 \leq R9/R11 \leq -4.60$. By controlling a ratio of the curvature radius of the object side surface of the fifth lens L5 to the curvature radius of the object side surface of the sixth lens L6, it is possible to prevent the fifth lens from being shaped to be overly curved, improve the process for manufacturing and shaping of the fifth lens, and reduce the aberrations of the optical imaging system.

When the on-axis thicknesses of the lenses, distances between the respective lenses, and the curvature radiuses of the side surfaces of the lenses of the camera optical lens 10 according to the present disclosure satisfy the above conditions, the camera optical lens 10 can achieve high performance.

The first lens L1 includes an object side surface being convex in a paraxial region and an image side surface being concave in the paraxial region.

A focal length of the camera optical lens 10 is defined as f, and a focal length of the first lens L1 is defined as f1. The camera optical lens 10 should satisfy a condition of $0.40 \leq f1/f \leq 1.23$, which specifies a ratio of the focal length f1 of the first lens L1 to the focal length f of the system. When the condition is satisfied, the first lens L1 can have an appropriate positive refractive power, thereby facilitating reducing aberrations of the system while facilitating development towards ultra-thin, wide-angle lenses. As an example, $0.65 \leq f1/f \leq 0.98$.

A curvature radius of the object side surface of the first lens L1 is defined as R1, and a curvature radius of the image side surface of the first lens L1 is defined as R2. The camera optical lens 10 should satisfy a condition of $-3.45 \leq (R1+R2)/(R1-R2) \leq -1.11$. This can reasonably control a shape of the first lens L1, so that the first lens L1 can effectively correct spherical aberrations of the system. As an example, $-2.16 \leq (R1+R2)/(R1-R2) \leq -1.39$.

An on-axis thickness of the first lens L1 is defined as d1, and a total optical length from the object side surface of the first lens L1 to an image plane of the camera optical lens 10 along an optic axis is defined as TTL. The camera optical lens 10 should satisfy a condition of $0.07 \leq d1/TTL \leq 0.21$. This can facilitate achieving ultra-thin lenses. As an example, $-0.11 \leq d1/TTL \leq 0.16$.

The second lens L2 includes an object side surface being convex in a paraxial region and an image side surface being concave in the paraxial region.

The focal length of the camera optical lens 10 is f, and the focal length of the second lens L2 is f2. The camera optical lens 10 further satisfies a condition of $-4.26 \leq f2/f \leq -1.30$. By controlling the negative refractive power of the second lens L2 within the reasonable range, correction of aberrations of the optical system can be facilitated. As an example, $-2.66 \leq f2/f \leq -1.62$ A curvature radius of the object side surface of the second lens L2 is defined as R3, and a curvature radius of the image side surface of the second lens L2 is defined as R4. The camera optical lens 10 should satisfy a condition of $1.70 \leq (R3+R4)/(R3-R4) \leq 5.50$, which specifies a shape of the second lens L2. This can facilitate correction of an on-axis aberration with development towards ultra-thin lenses. As an example, $2.72 \leq (R3+R4)/(R3-R4) \leq 4.40$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.02 \leq d3/TTL \leq 0.07$. This can facilitate achieving ultra-thin lenses. As an example, $0.03 \leq d3/TTL \leq 0.06$.

The third lens L3 includes an object side surface being convex in a paraxial region and an image side surface being concave in the paraxial region.

The focal length of the camera optical lens 10 is f, and the focal length of the third lens L3 is f3. The camera optical lens 10 further satisfies a condition of $-51.10 \leq f3/f \leq 53.81$. The appropriate distribution of the refractive power leads to better imaging quality and a lower sensitivity. As an example, $-31.94 \leq f3/f \leq 43.05$.

A curvature radius of the object side surface of the third lens L3 is defined as R5, and a curvature radius of the image side surface of the third lens L3 is defined as R6. The camera optical lens 10 should satisfy a condition of $-40.26 \leq (R5+R6)/(R5-R6) \leq 15.78$. This can effectively control a shape of the third lens L3, thereby facilitating shaping of the third lens L3 and avoiding bad shaping and generation of stress due to the overly large surface curvature of the third lens L3. As an example, $-25.16 \leq (R5+R6)/(R5-R6) \leq 12.62$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.03 \leq d5/TTL \leq 0.09$. This can facilitate achieving ultra-thin lenses. As an example, $0.05 \leq d5/TTL \leq 0.07$.

The fourth lens L4 includes an object side surface being concave in a paraxial region and an image side surface being convex in the paraxial region.

The focal length of the camera optical lens 10 is f, and the focal length of the fourth lens L4 is f4. The camera optical lens 10 further satisfies a condition of $-75.72 \leq f4/f \leq 273.90$. The appropriate distribution of the refractive power leads to better imaging quality and a lower sensitivity. As an example, $-47.32 \leq f4/f \leq 219.12$.

A curvature radius of the object side surface of the fourth lens L4 is defined as R7, and a curvature radius of the image side surface of the fourth lens L4 is defined as R8. The camera optical lens 10 should satisfy a condition of $-6.41 \leq (R7+R8)/(R7-R8) \leq 41.85$, which specifies a shape of the fourth lens L4. This can facilitate correction of an off-axis aberration with development towards ultra-thin lenses. As an example, −4.01≤(R7+R8)/(R7−R8)≤33.48.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of 0.03≤d7/TTL≤0.09. This can facilitate achieving ultra-thin lenses. As an example, 0.05≤d7/TTL≤0.07.

The fifth lens L5 includes an object side surface being concave in a paraxial region and an image side surface being convex in the paraxial region.

The focal length of the camera optical lens 10 is f, and the focal length of the fifth lens L5 is f5. The camera optical lens 10 further satisfies a condition of 0.74≤f5/f≤2.84. This condition can effectively make a light angle of the camera optical lens 10 gentle and reduce the tolerance sensitivity. As an example, 1.19≤f5/f≤2.27.

A curvature radius of the object side surface of the fifth lens L5 is defined as R9, and a curvature radius of the image side surface of the fifth lens L5 is defined as R10. The camera optical lens 10 should satisfy a condition of 0.71≤(R9+R10)/(R9−R10)≤2.39, which specifies a shape of the fifth lens L5. This can facilitate correction of an off-axis aberration with development towards ultra-thin lenses. As an example, 1.13≤(R9+R10)/(R9−R10)≤1.91.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of 0.06≤d9/TTL≤0.24. This can facilitate achieving ultra-thin lenses. As an example, 0.10≤d9/TTL≤0.19.

The sixth lens L6 includes an object side surface being convex in a paraxial region and an image side surface being concave in the paraxial region.

The focal length of the camera optical lens 10 is f, and the focal length of the sixth lens L6 is f6. The camera optical lens 10 further satisfies a condition of −2.43≤f6/f≤−0.64. The appropriate distribution of the refractive power leads to better imaging quality and a lower sensitivity. As an example, −1.52≤f6/f≤−0.81.

A curvature radius of the object side surface of the sixth lens L6 is defined as R11, and a curvature radius of the image side surface of the sixth lens L6 is defined as R12. The camera optical lens 10 should satisfy a condition of 1.09≤(R11+R12)/(R11−R12)≤3.69, which specifies a shape of the sixth lens L6. This can facilitate correction of an off-axis aberration with development towards ultra-thin lenses. As an example, 1.75≤(R11+R12)/(R11−R12)≤2.95.

An on-axis thickness of the sixth lens L6 is defined as d11, and the total optical length from the object side surface of the first lens L1 to an image plane of the camera optical lens 10 along an optic axis is defined as TTL. The camera optical lens 10 should satisfy a condition of 0.05≤d11/TTL≤0.22. This can facilitate achieving ultra-thin lenses. As an example, 0.07≤d11/TTL≤0.17.

In this embodiment, the focal length of the camera optical lens 10 is defined as f, and a combined focal length of the first lens L1 and the second lens L2 as defined as f12. The camera optical lens 10 should satisfy a condition of 0.57≤f12/f≤1.73. This can eliminate aberration and distortion of the camera optical lens 10, suppress the back focal length of the camera optical lens 10, and maintain miniaturization of the camera lens system group. As an example, 0.91≤f12/f≤1.38.

In this embodiment, the total optical length TTL of the camera optical lens 10 is smaller than or equal to 7.15 mm, which is beneficial for achieving ultra-thin lenses. As an example, the total optical length TTL of the camera optical lens 10 is smaller than or equal to 6.82 mm.

In this embodiment, an F number (FNO) of the camera optical lens 10 is smaller than or equal to 1.99. The camera optical lens 10 has a large aperture and better imaging performance. As an example, the F number of the camera optical lens 10 is smaller than or equal to 1.95.

With such design, the total optical length TTL of the camera optical lens 10 can be made as short as possible, and thus the miniaturization characteristics can be maintained.

When the above conditions are satisfied, the camera optical lens 10 will have high optical performance while satisfying design requirements for ultra-thin, wide-angle lenses having large apertures. With these characteristics, the camera optical lens 10 is especially suitable for high-pixel camera optical lens assembly of mobile phones and WEB camera optical lenses formed by imaging elements such as CCD and CMOS.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens L1 to the image plane of the camera optical lens along the optic axis) in mm.

F number (FNO): a ratio of an effective focal length of the camera optical lens to an entrance pupil diameter of the camera optical lens.

In an example, inflexion points and/or arrest points can be arranged on the object side surface and/or image side surface of the lens, so as to satisfy the demand for the high quality imaging. The description below can be referred to for specific implementations.

Table 1 shows design data of the camera optical lens 10 according to Embodiment 1 of the present disclosure.

TABLE 1

|     | R       | d       |     | nd     |     | vd    |
|-----|---------|---------|-----|--------|-----|-------|
| S1  | ∞       | d0=     | −0.598 |     |     |       |
| R1  | 1.936   | d1=     | 0.885  | nd1 | 1.5444 | v1 | 55.82 |
| R2  | 7.737   | d2=     | 0.104  |     |     |       |
| R3  | 5.669   | d3=     | 0.250  | nd2 | 1.6700 | v2 | 19.39 |
| R4  | 3.239   | d4=     | 0.458  |     |     |       |
| R5  | 17.287  | d5=     | 0.400  | nd3 | 1.6153 | v3 | 25.94 |
| R6  | 14.285  | d6=     | 0.157  |     |     |       |
| R7  | −49.797 | d7=     | 0.400  | nd4 | 1.6359 | v4 | 23.82 |
| R8  | −46.351 | d8=     | 0.281  |     |     |       |
| R9  | −19.484 | d9=     | 0.799  | nd5 | 1.5444 | v5 | 55.82 |
| R10 | −4.452  | d10=    | 0.598  |     |     |       |
| R11 | 4.231   | d11=    | 0.929  | nd6 | 1.5346 | v6 | 55.69 |
| R12 | 1.787   | d12=    | 0.600  |     |     |       |
| R13 | ∞       | d13=    | 0.210  | ndg | 1.5168 | vg | 64.20 |
| R14 | ∞       | d14=    | 0.396  |     |     |       |

In the table, meanings of various symbols will be described as follows.

S1: aperture;

R: central curvature radius for a lens;

R1: curvature radius of the object side surface of the first lens L1;

R2: curvature radius of the image side surface of the first lens L1;

R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of an object side surface of the optical filter GF;
R14: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows aspheric surface data of respective lens in the camera optical lens 10 according to Embodiment 1 of the present disclosure.

TABLE 2

| | Conic coefficient | Aspherical surface coefficients | | | |
|---|---|---|---|---|---|
| | k | A4 | A6 | A8 | A10 |
| R1 | −7.9253E−01 | 5.8493E−03 | 5.0971E−02 | −1.2919E−01 | 1.9592E−01 |
| R2 | 0.0000E+00 | −7.0582E−02 | 1.3747E−01 | −2.5912E−01 | 3.7999E−01 |
| R3 | 0.0000E+00 | −9.3932E−02 | 1.7070E−01 | −2.7812E−01 | 4.5760E−01 |
| R4 | 0.0000E+00 | −4.3120E−02 | 1.3121E−01 | −2.9745E−01 | 6.7424E−01 |
| R5 | 0.0000E+00 | −7.5177E−02 | 1.0675E−01 | −3.0858E−01 | 5.9158E−01 |
| R6 | 0.0000E+00 | −1.1736E−01 | 1.3122E−01 | −2.8580E−01 | 4.1088E−01 |
| R7 | 0.0000E+00 | −1.2840E−01 | 1.4038E−01 | −2.5325E−01 | 3.3459E−01 |
| R8 | 0.0000E+00 | −9.2148E−02 | 1.1766E−01 | −1.5723E−01 | 1.4938E−01 |
| R9 | 0.0000E+00 | −5.5192E−02 | 8.7555E−02 | −9.7250E−02 | 6.5468E−02 |
| R10 | 0.0000E+00 | −5.3647E−02 | 6.2256E−02 | −4.1374E−02 | 1.5785E−02 |
| R11 | 0.0000E+00 | −1.5013E−01 | 7.5675E−02 | −2.8939E−02 | 7.4980E−03 |
| R12 | −6.3360E+00 | −3.9109E−02 | 1.3852E−02 | −3.6246E−03 | 6.4296E−04 |

| | Aspherical surface coefficients | | | | |
|---|---|---|---|---|---|
| | A12 | A14 | A16 | A18 | A20 |
| R1 | −1.8109E−01 | 1.0456E−01 | −3.7101E−02 | 7.4587E−03 | −6.6087E−04 |
| R2 | −3.7722E−01 | 2.3979E−01 | −9.3210E−02 | 2.0132E−02 | −1.8571E−03 |
| R3 | −5.3934E−01 | 4.0755E−01 | −1.8648E−01 | 4.7238E−02 | −5.1272E−03 |
| R4 | −9.6965E−01 | 8.6800E−01 | −4.7738E−01 | 1.5328E−01 | −2.2409E−02 |
| R5 | −7.4681E−01 | 5.9707E−01 | −2.8699E−01 | 7.5834E−02 | −8.3589E−03 |
| R6 | −3.7731E−01 | 2.1665E−01 | −6.9046E−02 | 9.6681E−03 | −2.0305E−04 |
| R7 | −2.8739E−01 | 1.7027E−01 | −6.5761E−02 | 1.4423E−02 | −1.3432E−03 |
| R8 | −8.8852E−02 | 3.3730E−02 | −8.0560E−03 | 1.1037E−03 | −6.5970E−05 |
| R9 | −2.9251E−02 | 8.8443E−03 | −1.7183E−03 | 1.9126E−04 | −9.2034E−06 |
| R10 | −4.1341E−03 | 8.0847E−04 | −1.1661E−04 | 1.0715E−05 | −4.4584E−07 |
| R11 | −1.2581E−03 | 1.3455E−04 | −8.8602E−06 | 3.2766E−07 | −5.2129E−09 |
| R12 | −7.8192E−05 | 6.4010E−06 | −3.3537E−07 | 1.0101E−08 | −1.3229E−10 |

In Table 2, k is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

where x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

In the present embodiment, an aspheric surface of each lens surface uses the aspheric surfaces shown in the above condition (1). However, the present disclosure is not limited to the aspherical polynomial form shown in the condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively, and P6R1 and P6R2 represent the object side surface and the image side surface of the sixth lens L6, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 1.425 | \ | \ |
| P1R2 | 1 | 1.095 | \ | \ |
| P2R1 | 0 | \ | \ | \ |
| P2R2 | 0 | \ | \ | \ |
| P3R1 | 2 | 0.285 | 1.115 | \ |
| P3R2 | 2 | 0.245 | 1.135 | \ |
| P4R1 | 2 | 1.085 | 1.405 | \ |
| P4R2 | 2 | 1.145 | 1.555 | \ |
| P5R1 | 2 | 1.615 | 2.055 | \ |
| P5R2 | 1 | 1.935 | \ | \ |
| P6R1 | 2 | 0.405 | 2.035 | \ |
| P6R2 | 3 | 0.825 | 3.735 | 3.895 |

TABLE 4

| | Number of arrest points | Arrest point position 1 | Arrest point position 2 |
|---|---|---|---|
| P1R1 | 0 | \ | \ |
| P1R2 | 1 | 1.345 | \ |
| P2R1 | 0 | \ | \ |
| P2R2 | 0 | \ | \ |
| P3R1 | 1 | 0.505 | \ |
| P3R2 | 2 | 0.425 | 1.395 |
| P4R1 | 0 | \ | \ |
| P4R2 | 0 | \ | \ |
| P5R1 | 0 | \ | \ |
| P5R2 | 0 | \ | \ |
| P6R1 | 2 | 0.785 | 3.205 |
| P6R2 | 1 | 2.155 | \ |

Figure 2:
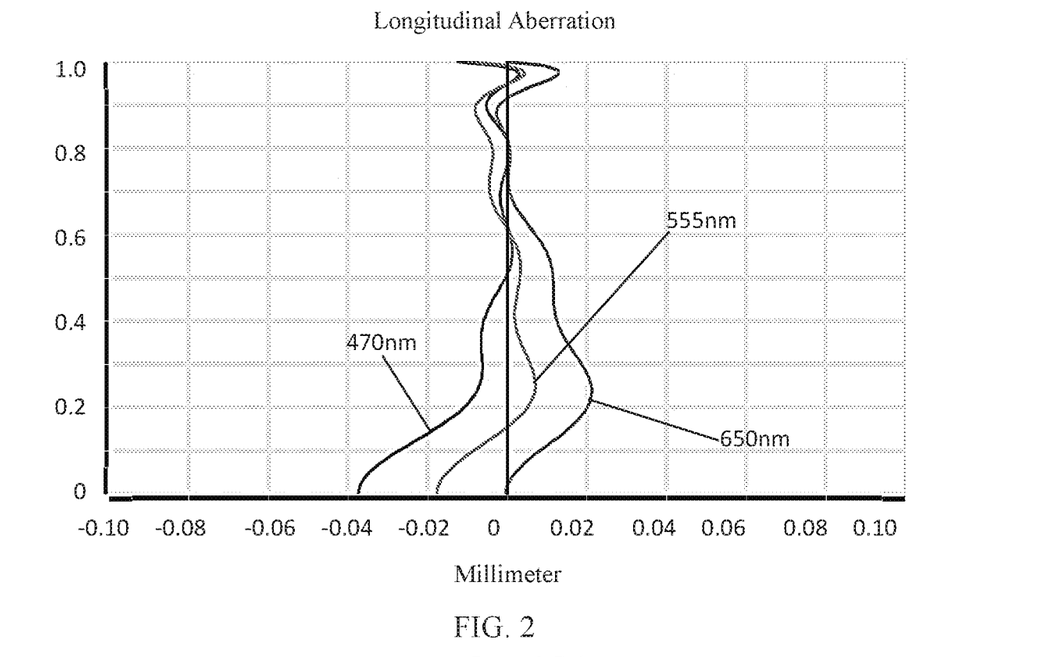
FIG. 2 is a schematic diagram of a longitudinal aberration of the camera optical lens shown in FIG. 1.
Figure 3:
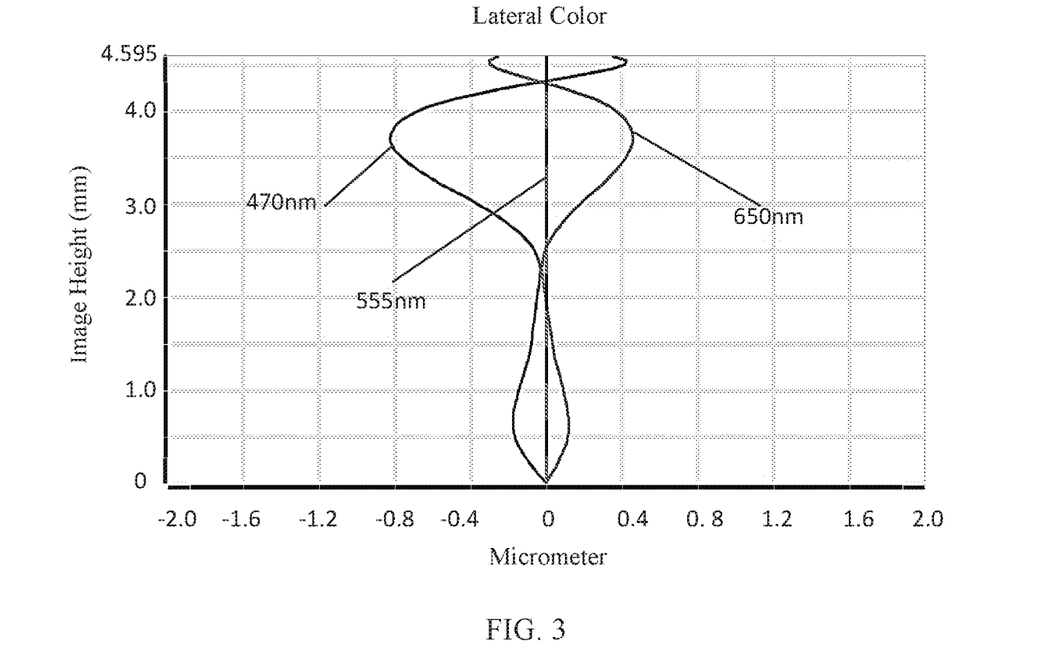
FIG. 3 is a schematic diagram of a lateral color of the camera optical lens shown in FIG. 1.
Figure 4:
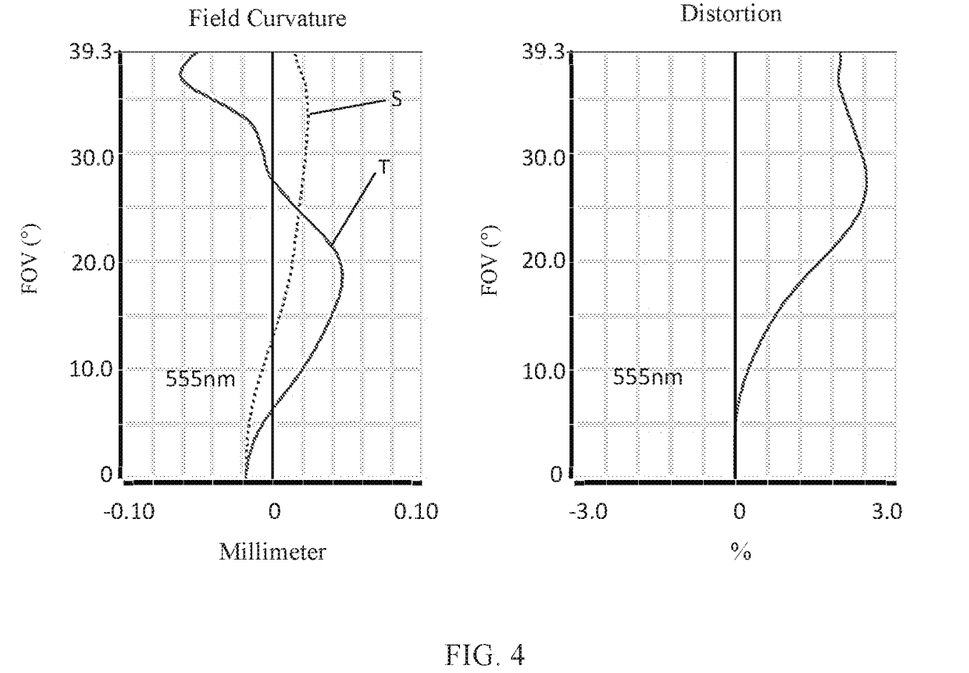
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 555 nm and 470 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 13 below further lists various values of Embodiments 1, 2 and 3 and values corresponding to parameters which are specified in the above conditions.

As shown in Table 13, Embodiment 1 satisfies the respective conditions.

In this embodiment, the entrance pupil diameter (ENPD) of the camera optical lens is 2.885 mm. The image height of 1.0H is 4.595 mm. The FOV (field of view) along a diagonal direction is 78.61°. Thus, the camera optical lens 10 can provide an ultra-thin, wide-angle lens while having on-axis and off-axis aberrations sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

Figure 5:
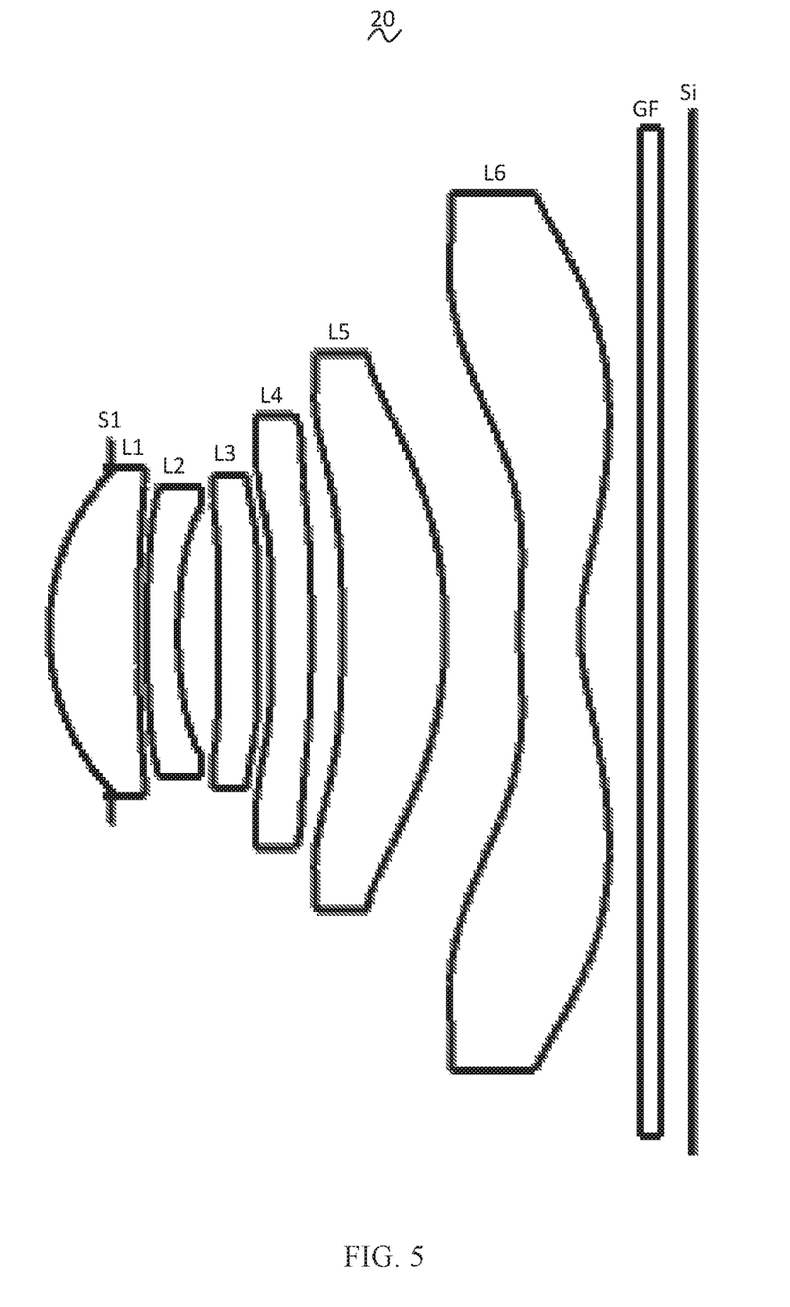
FIG. 5 is a schematic diagram of a structure of a camera optical lens in accordance with Embodiment 2 of the present disclosure.

The object side surface of the fourth lens L4 is convex in a paraxial region and the image side surface of the fourth lens L4 is concave in the paraxial region.

Table 5 shows design data of a camera optical lens 20 in Embodiment 2 of the present disclosure.

TABLE 5

| | R | d | | nd | | vd |
|---|---|---|---|---|---|---|
| S1 | ∞ | d0= | −0.623 | | | |
| R1 | 1.919 | d1= | 0.888 | nd1 | 1.5444 | v1 55.82 |
| R2 | 7.203 | d2= | 0.089 | | | |
| R3 | 5.867 | d3= | 0.320 | nd2 | 1.6700 | v2 19.39 |
| R4 | 3.230 | d4= | 0.399 | | | |
| R5 | 15.566 | d5= | 0.400 | nd3 | 1.5835 | v3 30.27 |
| R6 | 11.541 | d6= | 0.143 | | | |
| R7 | 41.321 | d7= | 0.400 | nd4 | 1.6153 | v4 25.94 |
| R8 | 146.628 | d8= | 0.313 | | | |
| R9 | −22.265 | d9= | 1.039 | nd5 | 1.5444 | v5 55.82 |
| R10 | −3.815 | d10= | 0.755 | | | |
| R11 | 4.498 | d11= | 0.608 | nd6 | 1.5346 | v6 55.69 |
| R12 | 1.673 | d12= | 0.600 | | | |
| R13 | ∞ | d13= | 0.210 | ndg | 1.5168 | vg 64.20 |
| R14 | ∞ | d14= | 0.331 | | | |

Table 6 shows aspheric surface data of respective lenses in the camera optical lens 20 according to Embodiment 2 of the present disclosure.

TABLE 6

| | Conic coefficient | Aspherical surface coefficients | | | |
|---|---|---|---|---|---|
| | k | A4 | A6 | A8 | A10 |
| R1 | −7.6722E−01 | 6.2275E−03 | 5.0672E−02 | −1.2918E−01 | 1.9701E−01 |
| R2 | 0.0000E+00 | −8.1175E−02 | 1.6183E−01 | −3.0820E−01 | 4.6777E−01 |
| R3 | 0.0000E+00 | −8.9462E−02 | 1.4202E−01 | −1.8149E−01 | 2.4777E−01 |
| R4 | 0.0000E+00 | −3.8700E−02 | 1.3135E−01 | −3.1071E−01 | 6.8084E−01 |
| R5 | 0.0000E+00 | −7.6518E−02 | 1.0529E−01 | −3.0821E−01 | 5.9305E−01 |
| R6 | 0.0000E+00 | −1.0769E−01 | 6.3759E−02 | −2.5541E−02 | −1.4109E−01 |
| R7 | 0.0000E+00 | −1.2702E−01 | 1.4970E−01 | −2.3577E−01 | 2.6312E−01 |
| R8 | 0.0000E+00 | −8.6178E−02 | 8.9464E−02 | −9.3991E−02 | 7.7536E−02 |
| R9 | 0.0000E+00 | −4.9029E−02 | 3.1351E−02 | −2.2687E−02 | 1.1328E−02 |
| R10 | 0.0000E+00 | −2.4537E−02 | 2.0522E−02 | −1.1120E−02 | 4.5908E−03 |
| R11 | −1.0000E+00 | −1.6385E−01 | 7.1288E−02 | −2.2193E−02 | 4.8491E−03 |
| R12 | −5.6281E+00 | −6.3915E−02 | 2.5282E−02 | −6.9516E−03 | 1.2942E−03 |

| | Aspherical surface coefficients | | | | |
|---|---|---|---|---|---|
| | A12 | A14 | A16 | A18 | A20 |
| R1 | −1.8142E−01 | 1.0428E−01 | −3.6975E−02 | 7.5040E−03 | −6.7982E−04 |
| R2 | −4.8150E−01 | 3.1788E−01 | −1.2875E−01 | 2.9118E−02 | −2.8250E−03 |
| R3 | −2.6287E−01 | 1.8479E−01 | −7.9467E−02 | 1.8924E−02 | −1.9235E−03 |
| R4 | −9.6294E−01 | 8.6236E−01 | −4.7241E−01 | 1.4559E−01 | −1.9002E−02 |
| R5 | −7.4618E−01 | 5.9707E−01 | −2.8805E−01 | 7.5986E−02 | −8.1632E−03 |
| R6 | 3.0995E−01 | −3.0169E−01 | 1.6534E−01 | −4.8969E−02 | 6.0363E−03 |
| R7 | −2.0332E−01 | 1.2019E−01 | −4.9890E−02 | 1.2054E−02 | −1.2404E−03 |
| R8 | −3.9715E−02 | 1.2491E−02 | −2.4116E−03 | 2.6705E−04 | −1.3208E−05 |
| R9 | −3.1864E−03 | 4.5432E−04 | −1.5165E−05 | −3.5142E−06 | 3.0838E−07 |
| R10 | −1.5159E−03 | 3.9386E−04 | −6.9667E−05 | 6.9777E−06 | −2.9038E−07 |
| R11 | −7.0476E−04 | 6.6115E−05 | −3.8401E−06 | 1.2561E−07 | −1.7713E−09 |
| R12 | −1.6366E−04 | 1.3746E−05 | −7.2883E−07 | 2.1974E−08 | −2.8615E−10 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 |
|---|---|---|---|---|
| P1R1 | 0 | \ | \ | \ |
| P1R2 | 1 | 1.205 | \ | \ |
| P2R1 | 0 | \ | \ | \ |
| P2R2 | 0 | \ | \ | \ |
| P3R1 | 2 | 0.295 | 1.095 | \ |
| P3R2 | 2 | 0.275 | 1.115 | \ |
| P4R1 | 3 | 0.135 | 1.095 | 1.395 |
| P4R2 | 3 | 0.085 | 1.105 | 1.545 |
| P5R1 | 1 | 1.565 | \ | \ |
| P5R2 | 1 | 2.065 | \ | \ |
| P6R1 | 3 | 0.365 | 1.975 | 3.515 |
| P6R2 | 3 | 0.715 | 3.555 | 3.885 |

TABLE 8

| | Number of arrest points | Arrest point position 1 | Arrest point position 2 |
|---|---|---|---|
| P1R1 | 0 | \ | \ |
| P1R2 | 0 | \ | \ |
| P2R1 | 0 | \ | \ |
| P2R2 | 0 | \ | \ |
| P3R1 | 1 | 0.525 | \ |
| P3R2 | 1 | 0.495 | \ |
| P4R1 | 1 | 0.225 | \ |
| P4R2 | 1 | 0.145 | \ |
| P5R1 | 1 | 2.085 | \ |
| P5R2 | 1 | 2.455 | \ |
| P6R1 | 2 | 0.675 | 3.235 |
| P6R2 | 1 | 1.905 | \ |

Figure 6:
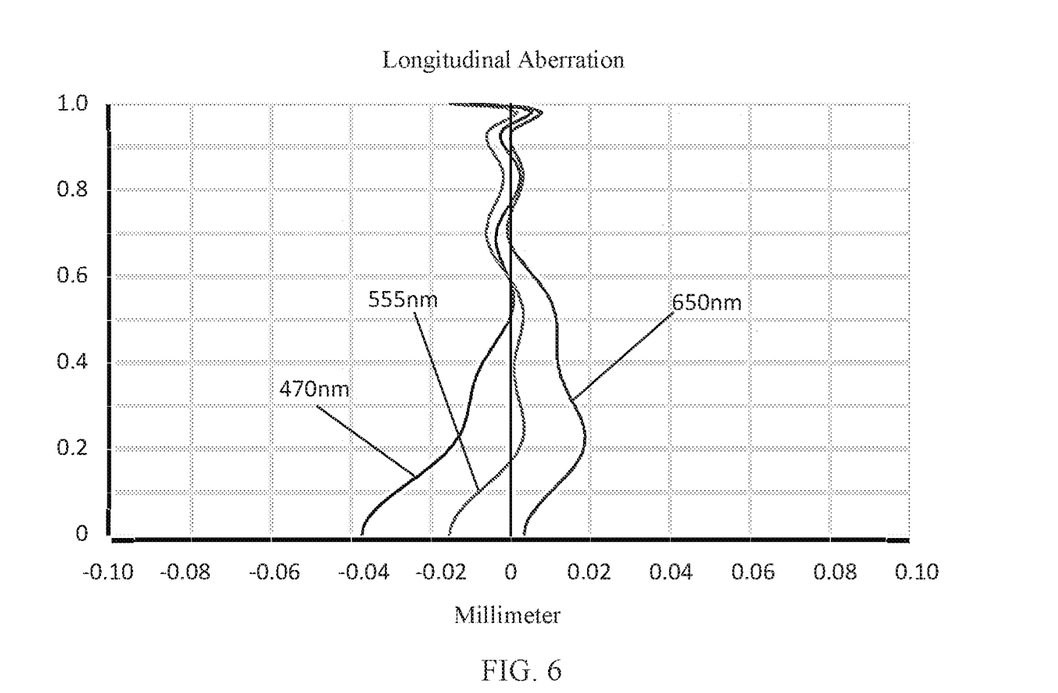
FIG. 6 is a schematic diagram of a longitudinal aberration of the camera optical lens shown in FIG. 5.
Figure 7:
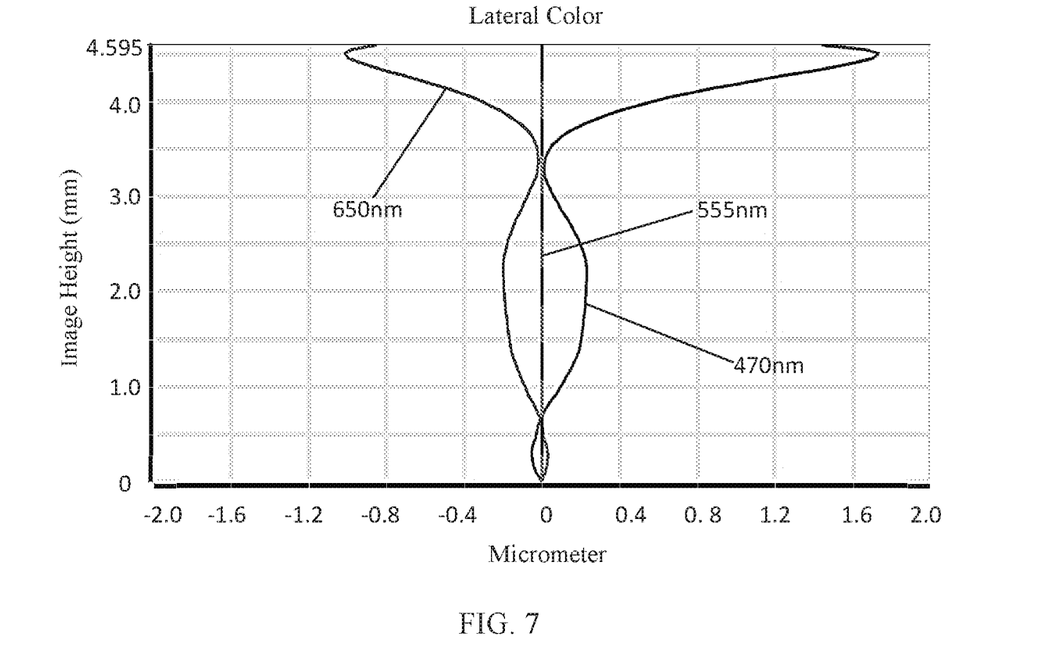
FIG. 7 is a schematic diagram of a lateral color of the camera optical lens shown in FIG. 5.
Figure 8:
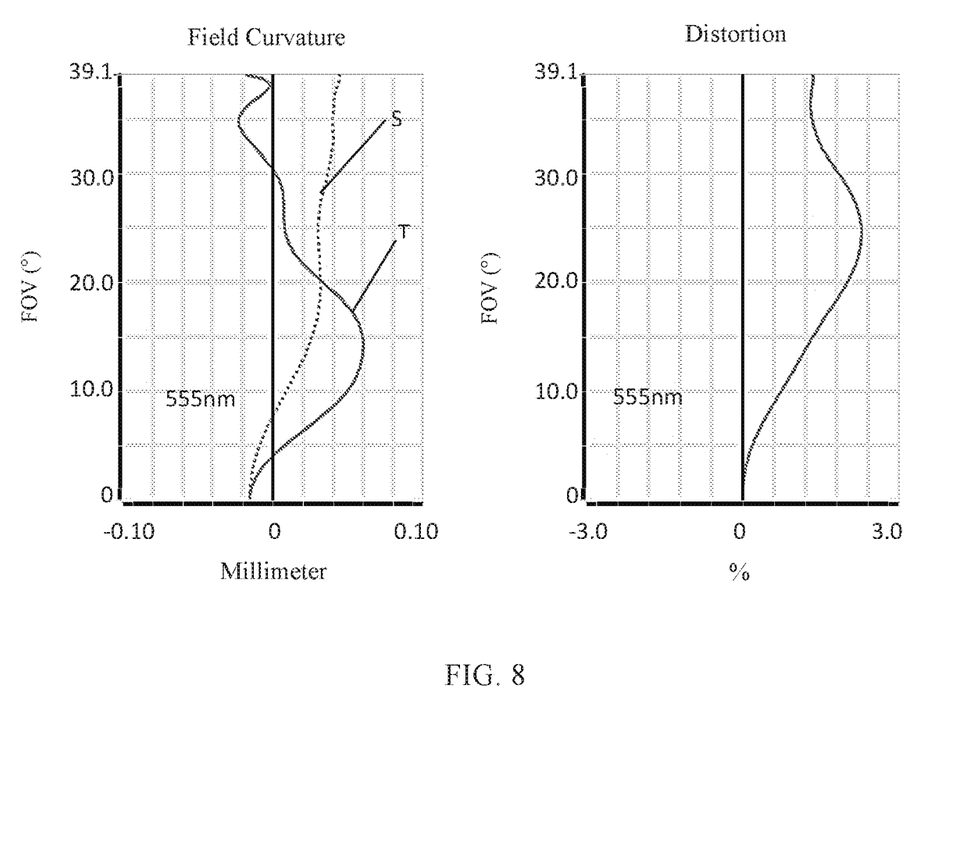
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 555 nm and 470 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 13, Embodiment 2 satisfies the respective conditions.

In this embodiment, the entrance pupil diameter (ENPD) of the camera optical lens is 2.920 mm. The image height of 1.0H is 4.595 mm. The FOV (field of view) along a diagonal direction is 78.23°. Thus, the camera optical lens 20 can provide an ultra-thin, wide-angle lens while having on-axis and off-axis aberrations sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

Figure 9:
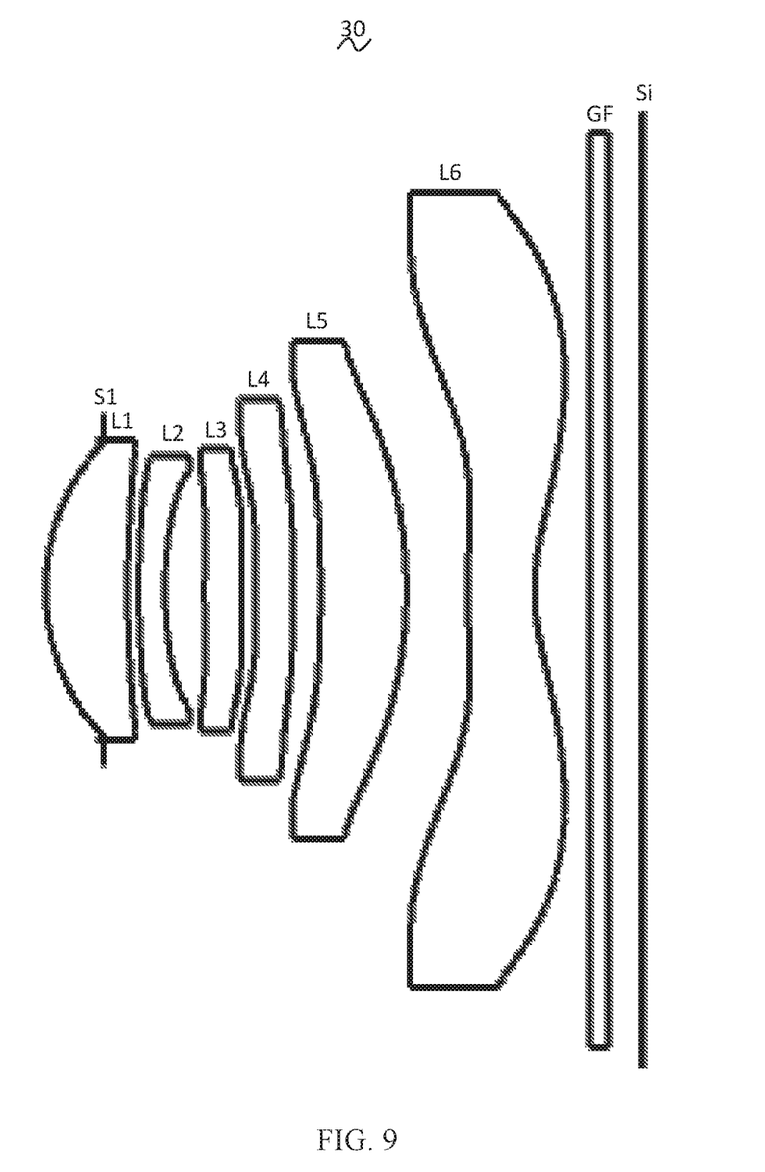
FIG. 9 is a schematic diagram of a structure of a camera optical lens in accordance with Embodiment 3 of the present disclosure.

The third lens L3 has a positive refractive power, and the fourth lens L4 has a negative refractive power.

Table 9 shows design data of a camera optical lens 30 in Embodiment 3 of the present disclosure.

TABLE 9

| | R | d | | nd | | vd |
|---|---|---|---|---|---|---|
| S1 | ∞ | d0= | −0.638 | | | |
| R1 | 1.918 | d1= | 0.888 | nd1 | 1.5444 | v1 55.82 |
| R2 | 7.296 | d2= | 0.119 | | | |
| R3 | 5.847 | d3= | 0.288 | nd2 | 1.6700 | v2 19.39 |
| R4 | 3.191 | d4= | 0.431 | | | |

TABLE 9-continued

|     | R        | d    |       | nd  |        | vd  |       |
|-----|----------|------|-------|-----|--------|-----|-------|
| R5  | 13.045   | d5=  | 0.400 | nd3 | 1.6153 | v3  | 25.94 |
| R6  | 14.409   | d6=  | 0.161 |     |        |     |       |
| R7  | −64.152  | d7=  | 0.400 | nd4 | 1.6359 | v4  | 23.82 |
| R8  | −122.341 | d8=  | 0.299 |     |        |     |       |
| R9  | −20.615  | d9=  | 0.936 | nd5 | 1.5444 | v5  | 55.82 |
| R10 | −4.150   | d10= | 0.665 |     |        |     |       |
| R11 | 4.295    | d11= | 0.728 | nd6 | 1.5346 | v6  | 55.69 |
| R12 | 1.712    | d12= | 0.600 |     |        |     |       |
| R13 | ∞        | d13= | 0.210 | ndg | 1.5168 | vg  | 64.20 |
| R14 | ∞        | d14= | 0.372 |     |        |     |       |

Table 10 shows aspheric surface data of respective lenses in the camera optical lens 30 according to Embodiment 3 of the present disclosure.

TABLE 10

| | Conic coefficient | Aspherical surface coefficients | | | |
|---|---|---|---|---|---|
| | k | A4 | A6 | A8 | A10 |
| R1  | −7.8292E−01 | 5.7501E−03  | 5.1740E−02 | −1.2912E−01 | 1.9587E−01  |
| R2  | 0.0000E+00  | −5.1508E−02 | 5.4857E−02 | −4.4826E−02 | 3.1584E−02  |
| R3  | 0.0000E+00  | −7.2992E−02 | 4.3078E−02 | 1.1152E−01  | −2.8565E−01 |
| R4  | 0.0000E+00  | −4.7217E−02 | 1.3410E−01 | −2.9996E−01 | 6.7187E−01  |
| R5  | 0.0000E+00  | −7.4885E−02 | 1.0511E−01 | −3.0798E−01 | 5.9270E−01  |
| R6  | 0.0000E+00  | −9.2006E−02 | 2.6113E−02 | 2.2480E−02  | −1.6362E−01 |
| R7  | 0.0000E+00  | −1.0004E−01 | 6.0673E−02 | −6.2750E−02 | 4.3723E−02  |
| R8  | 0.0000E+00  | −7.3072E−02 | 6.1945E−02 | −6.6439E−02 | 5.7177E−02  |
| R9  | 0.0000E+00  | −3.5480E−02 | 2.3753E−02 | −2.5175E−02 | 1.4708E−02  |
| R10 | 0.0000E+00  | −2.5637E−02 | 3.0327E−02 | −1.9364E−02 | 7.2925E−03  |
| R11 | 0.0000E+00  | −1.4726E−01 | 6.8428E−02 | −2.4542E−02 | 6.1125E−03  |
| R12 | −5.8653E+00 | −5.0099E−02 | 1.9167E−02 | −5.3195E−03 | 1.0031E−03  |

| | Aspherical surface coefficients | | | | |
|---|---|---|---|---|---|
| | A12 | A14 | A16 | A18 | A20 |
| R1  | −1.8095E−01 | 1.0461E−01  | −3.7129E−02 | 7.4498E−03  | −6.5245E−04 |
| R2  | −1.1562E−02 | −4.4643E−03 | 6.8883E−03  | −2.7846E−03 | 3.9068E−04  |
| R3  | 3.5929E−01  | −2.7897E−01 | 1.3418E−01  | −3.6558E−02 | 4.2952E−03  |
| R4  | −9.6617E−01 | 8.7077E−01  | −4.7970E−01 | 1.5085E−01  | −2.0906E−02 |
| R5  | −7.4651E−01 | 5.9715E−01  | −2.8708E−01 | 7.5793E−02  | −8.4319E−03 |
| R6  | 2.9479E−01  | −2.7777E−01 | 1.5313E−01  | −4.5833E−02 | 5.6703E−03  |
| R7  | −1.2629E−02 | 6.8599E−03  | −6.0545E−03 | 2.2363E−03  | −2.8434E−04 |
| R8  | −2.7498E−02 | 7.1978E−03  | −9.6277E−04 | 4.7460E−05  | 7.2275E−07  |
| R9  | −4.6335E−03 | 9.3742E−04  | −1.4578E−04 | 1.6751E−05  | −9.3531E−07 |
| R10 | −1.7748E−03 | 3.2101E−04  | −4.5266E−05 | 4.2338E−06  | −1.7884E−07 |
| R11 | −9.9488E−04 | 1.0331E−04  | −6.5944E−06 | 2.3593E−07  | −3.6263E−09 |
| R12 | −1.2892E−04 | 1.1081E−05  | −6.0662E−07 | 1.9027E−08  | −2.5888E−10 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 0 | \ | \ | \ |
| P1R2 | 1 | 1.305 | \ | \ |
| P2R1 | 0 | \ | \ | \ |
| P2R2 | 0 | \ | \ | \ |
| P3R1 | 2 | 0.335 | 1.105 | \ |
| P3R2 | 2 | 0.265 | 1.115 | \ |
| P4R1 | 2 | 1.095 | 1.435 | \ |
| P4R2 | 2 | 1.125 | 1.535 | \ |
| P5R1 | 1 | 1.535 | \ | \ |
| P5R2 | 1 | 1.875 | \ | \ |
| P6R1 | 2 | 0.405 | 2.035 | \ |
| P6R2 | 3 | 0.775 | 3.625 | 3.845 |

TABLE 12

| | Number of arrest points | Arrest point position 1 | Arrest point position 2 |
|---|---|---|---|
| P1R1 | 0 | \ | \ |
| P1R2 | 0 | \ | \ |
| P2R1 | 0 | \ | \ |
| P2R2 | 0 | \ | \ |
| P3R1 | 1 | 0.585 | \ |
| P3R2 | 1 | 0.455 | \ |
| P4R1 | 0 | \ | \ |
| P4R2 | 0 | \ | \ |
| P5R1 | 0 | \ | \ |
| P5R2 | 0 | \ | \ |
| P6R1 | 2 | 0.765 | 3.275 |
| P6R2 | 1 | 2.045 | \ |

Figure 10:
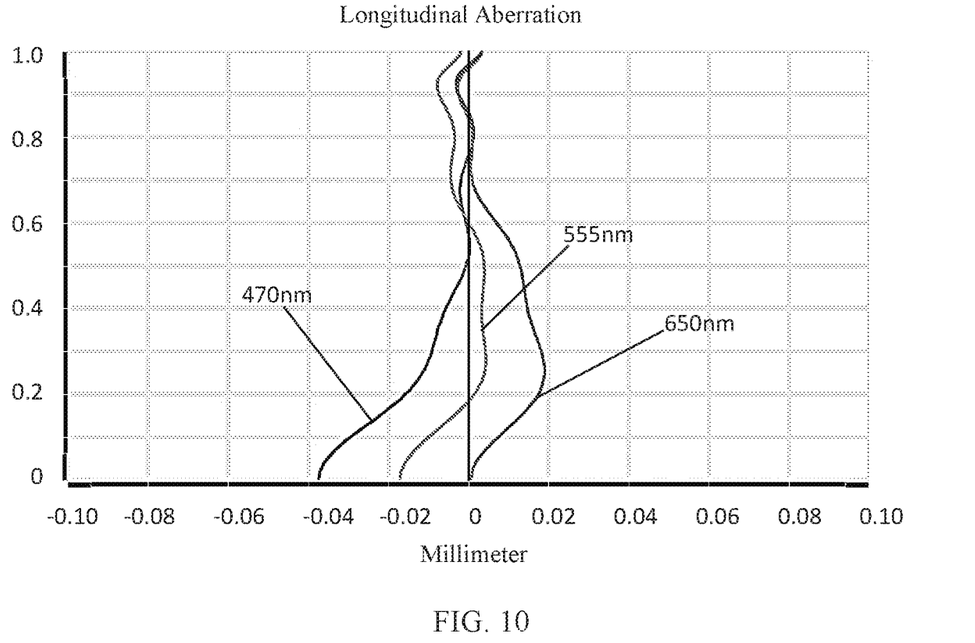
FIG. 10 is a schematic diagram of a longitudinal aberration of the camera optical lens shown in FIG. 9.
Figure 11:
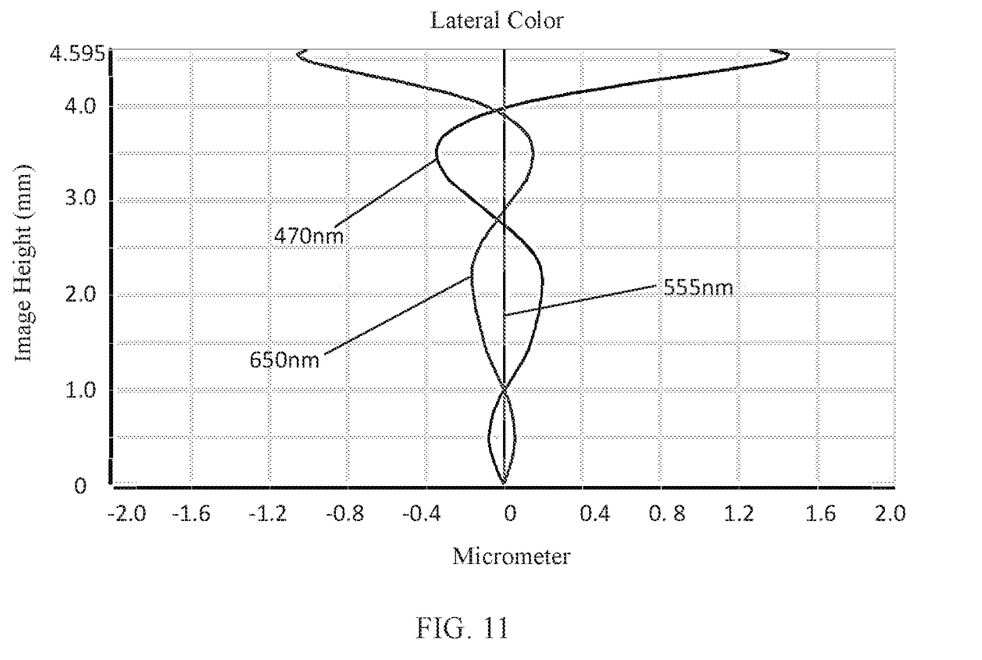
FIG. 11 is a schematic diagram of a lateral color of the camera optical lens shown in FIG. 9.
Figure 12:
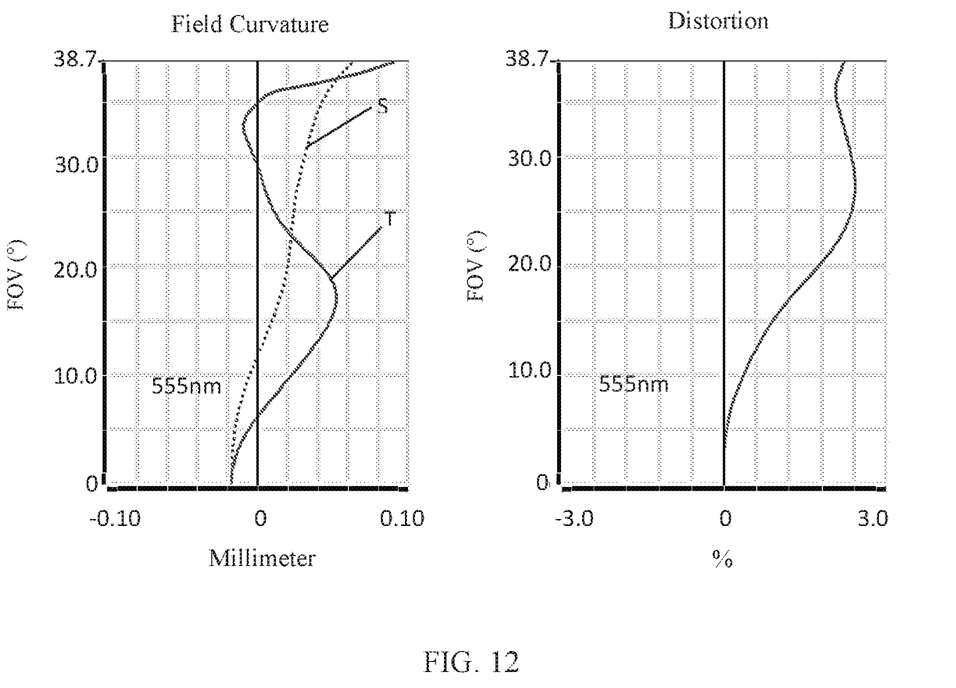
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 555 nm and 470 nm after passing the camera optical lens 30 according to Embodiment 3. FIG. 12 illustrates field curvature and distortion of light with a wavelength of 555 nm after passing the camera optical lens 30 according to Embodiment 3.

Table 13 below further lists various values of the present embodiment and values corresponding to parameters which are specified in the above conditions. Obviously, the camera optical lens according to this embodiment satisfies the above conditions.

In this embodiment, the entrance pupil diameter (ENPD) of the camera optical lens is 2.885 mm. The image height of 1.0H is 4.595 mm. The FOV (field of view) along a diagonal direction is 77.48°. Thus, the camera optical lens can provide an ultra-thin, wide-angle lens while having on-axis and off-axis aberrations sufficiently corrected, thereby leading to better optical characteristics.

TABLE 13

| Parameters and Conditions | Embodiment 1 | Embodiment 2 | Embodiment 3 |
|---|---|---|---|
| (d1 + d2)/d3 | 3.95 | 3.05 | 3.50 |
| (d9 + d10)/d11 | 1.51 | 2.95 | 2.20 |
| R9/R11 | −4.61 | −4.95 | −4.80 |
| f | 5.477 | 5.550 | 5.575 |
| f1 | 4.485 | 4.522 | 4.502 |
| f2 | −11.656 | −11.178 | −10.861 |
| f3 | −139.920 | −78.930 | 200.000 |
| f4 | 1000.000 | 92.733 | −211.075 |
| f5 | 10.372 | 8.266 | 9.326 |
| f6 | −6.650 | −5.370 | −5.889 |
| f12 | 6.252 | 6.373 | 6.424 |
| FNO | 1.90 | 1.90 | 1.93 |
| TTL | 6.467 | 6.493 | 6.497 |
| FOV | 78.61 | 78.23 | 77.48 |
| IH | 4.595 | 4.595 | 4.595 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, sequentially comprising, from an object side to an image side:
    a first lens having a positive refractive power;
    a second lens having a negative refractive power;
    a third lens;
    a fourth lens;
    a fifth lens having a positive refractive power; and
    a sixth lens having a negative refractive power,
    wherein an F number of the camera optical lens is smaller than or equal to 1.99,
and the camera optical lens satisfies following conditions:
    $3.00 \leq (d1+d2)/d3 \leq 4.00$;
    $1.50 \leq (d9+d10)/d11 \leq 3.00$; and
    $-5\,0.00 \leq R9/R11 \leq -4\,0.60$,
    where
    d1 denotes an on-axis thickness of the first lens;
    d2 denotes an on-axis distance from an image side surface of the first lens to an object side surface of the second lens;
    d3 denotes an on-axis thickness of the second lens;
    d9 denotes an on-axis thickness of the fifth lens;
    d10 denotes an on-axis distance from an image side surface of the fifth lens to an object side surface of the sixth lens;
    d11 denotes an on-axis thickness of the sixth lens;
    R9 denotes a curvature radius of an object side surface of the fifth lens; and
    R11 denotes a curvature radius of the object side surface of the sixth lens.

2. The camera optical lens as described in claim 1, wherein the first lens comprises an object side surface being convex in a paraxial region and an image side surface being concave in the paraxial region, and the camera optical lens satisfies following conditions:
    $0.40 \leq f1/f \leq 1.23$;
    $-3.45 \leq (R1+R2)/(R1-R2) \leq -1.11$; and
    $0.07 \leq d1/TTL \leq 0.21$,
    where
    f denotes a focal length of the camera optical lens;
    f1 denotes a focal length of the first lens;
    R1 denotes a curvature radius of the object side surface of the first lens;
    R2 denotes a curvature radius of the image side surface of the first lens; and
    TTL denotes a total optical length from the object side surface of the first lens to an image plane of the camera optical lens along an optic axis.

3. The camera optical lens as described in claim 2, further satisfying following conditions:
    $0.65 \leq f1/f \leq 0.98$;
    $-2.16 \leq (R1+R2)/(R1-R2) \leq -1.39$; and
    $0.11 \leq d1/TTL \leq 0.16$.

4. The camera optical lens as described in claim 1, wherein the second lens comprises an object side surface being convex in a paraxial region and an image side surface being concave in the paraxial region, and the camera optical lens satisfies following conditions:
    $-4.26 \leq f2/f \leq -1.30$;
    $1.70 \leq (R3+R4)/(R3-R4) \leq 5.50$; and
    $0.02 \leq d3/TTL \leq 0.07$,
    where
    f denotes a focal length of the camera optical lens;
    f2 denotes a focal length of the second lens;
    R3 denotes a curvature radius of the object side surface of the second lens;
    R4 denotes a curvature radius of the image side surface of the second lens; and
    TTL denotes a total optical length from an object side surface of the first lens to an image plane of the camera optical lens along an optic axis.

5. The camera optical lens as described in claim 4, further satisfying following conditions:
    $-2.66 \leq f2/f \leq -1.62$;
    $2.72 \leq (R3+R4)/(R3-R4) \leq 4.40$; and
    $0.03 \leq d3/TTL \leq 0.06$.

6. The camera optical lens as described in claim 1, wherein the third lens comprises an object side surface being convex in a paraxial region and an image side surface being concave in the paraxial region, and the camera optical lens satisfies following conditions:
    $-51.10 \leq f3/f \leq 53.81$;
    $-40.26 \leq (R5+R6)/(R5-R6) \leq 15.78$; and
    $0.03 \leq d5/TTL \leq 0.09$,
    where
    f denotes a focal length of the camera optical lens;
    f3 denotes a focal length of the third lens;
    R5 denotes a curvature radius of the object side surface of the third lens;
    R6 denotes a curvature radius of the image side surface of the third lens;
    d5 denotes an on-axis thickness of the third lens; and
    TTL denotes a total optical length from an object side surface of the first lens to an image plane of the camera optical lens along an optic axis.

7. The camera optical lens as described in claim 6, further satisfying following conditions:
    $-31.94 \leq f3/f \leq 43.05$;
    $-25.16 \leq (R5+R6)/(R5-R6) \leq 12.62$; and
    $0.05 \leq d5/TTL \leq 0.07$.

8. The camera optical lens as described in claim 1, further satisfying following conditions:

-75.72≤f4/f≤273.90;
-6.41≤(R7+R8)/(R7-R8)≤41.85; and
0.03≤d7/TTL≤0.09, where f denotes a focal length of the camera optical lens;
f4 denotes a focal length of fourth lens;
R7 denotes a curvature radius of an object side surface of the fourth lens;
R8 denotes a curvature radius of an image side surface of the fourth lens;
d7 denotes an on-axis thickness of the fourth lens; and
TTL denotes a total optical length from an object side surface of the first lens to an image plane of the camera optical lens along an optic axis.

9. The camera optical lens as described in claim 8, further satisfying following conditions:

-47.32≤f4/f≤219.12;
-4.01≤(R7+R8)/(R7-R8)≤33.48; and
0.05≤d7/TTL≤0.07.

10. The camera optical lens as described in claim 1, wherein the object side surface of the fifth lens is concave in a paraxial region and the image side surface of the fifth lens is convex in the paraxial region, and the camera optical lens satisfies following conditions:

0.74≤f5/f≤2.84;
0.71≤(R9+R10)/(R9-R10)≤2.39; and
0.06≤d9/TTL≤0.24, where f denotes a focal length of the camera optical lens;
f5 denotes a focal length of the fifth lens;
R10 denotes a curvature radius of the image side surface of the fifth lens; and
TTL denotes a total optical length from an object side surface of the first lens to an image plane of the camera optical lens along an optic axis.

11. The camera optical lens as described in claim 10, further satisfying following conditions:

1.19≤f5/f≤2.27;
1.13≤(R9+R10)/(R9-R10)≤1.91; and
0.10≤d9/TTL≤0.19.

12. The camera optical lens as described in claim 1, wherein the object side surface of the sixth lens is convex in a paraxial region and an image side surface of the sixth lens is concave in the paraxial region, and the camera optical lens satisfies following conditions:

-2.43≤f6/f≤-0.64;
1.09≤(R11+R12)/(R11-R12)≤3.69; and
0.05≤d11/TTL≤0.22, where f denotes a focal length of the camera optical lens;
f6 denotes a focal length of the sixth lens;
R12 denotes a curvature radius of the image side surface of the sixth lens; and
TTL denotes a total optical length from an object side surface of the first lens to an image plane of the camera optical lens along an optic axis.

13. The camera optical lens as described in claim 12, further satisfying following conditions:

-1.52≤f6/f≤-0.81;
75≤(R11+R12)/(R11-R12)≤2.95; and
0.07≤d11/TTL≤0.17.

14. The camera optical lens as described in claim 1, further satisfying a following condition:

0.57≤f12/f≤1.73, where f denotes a focal length of the camera optical lens; and
f12 denotes a combined focal length of the first lens and the second lens.

15. The camera optical lens as described in claim 14, further satisfying a following condition:

0.91≤f12/f≤1.38.

16. The camera optical lens as described in claim 1, wherein a total optical length TTL from an object side surface of the first lens to an image plane of the camera optical lens along an optic axis is smaller than or equal to 7.15 mm.

17. The camera optical lens as described in claim 16, wherein the total optical length TTL of the camera optical lens is smaller than or equal to 6.82 mm.

18. The camera optical lens as described in claim 1, wherein the F number of the camera optical lens is smaller than or equal to 1.95.

* * * * *